Oct. 13, 1970 G. J. BRITZMAN 3,533,553
AERATING FOUNTAIN DEVICE
Filed July 30, 1968
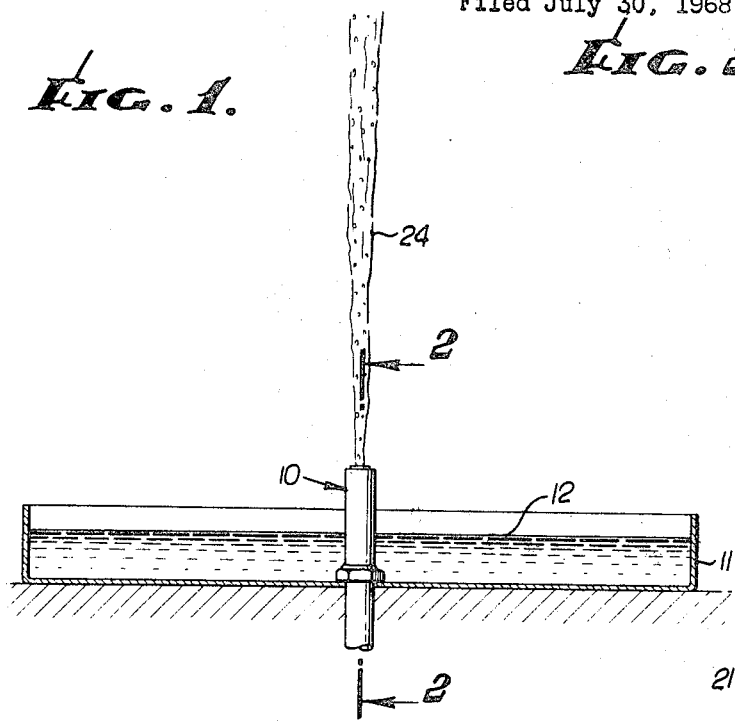
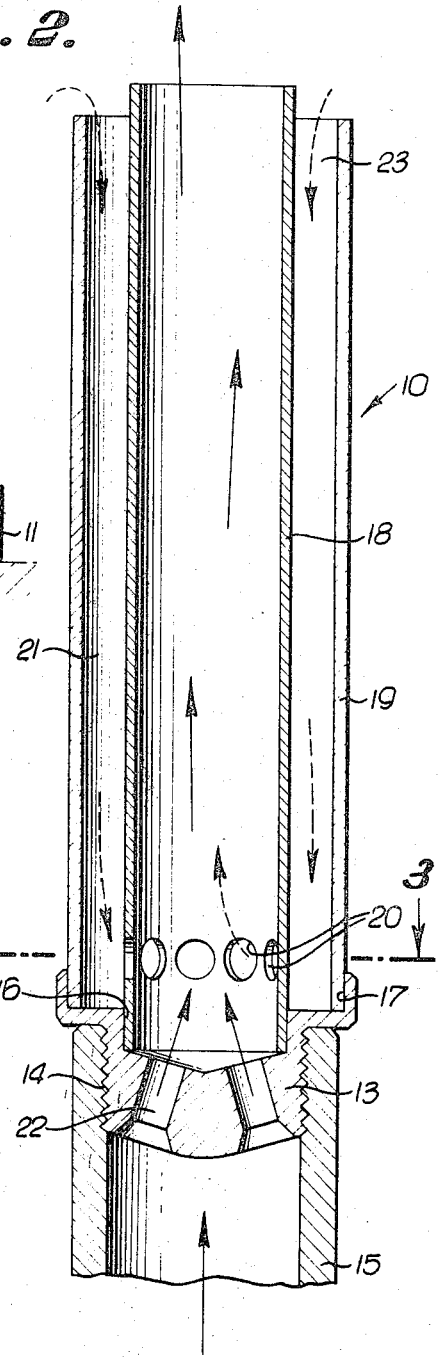
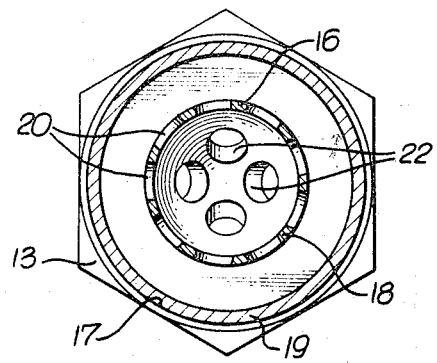
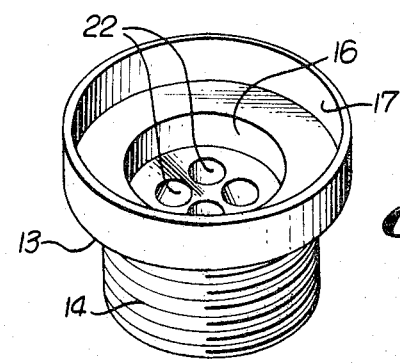
INVENTOR.
GILBERT J. BRITZMAN
By White & Haefliger
ATTORNEYS.

United States Patent Office 3,533,553
Patented Oct. 13, 1970

3,533,553
AERATING FOUNTAIN DEVICE
Gilbert J. Britzman, Hacienda Heights, Calif., assignor, by mesne assignments, to Meridian Enterprises, Inc., Los Angeles, Calif., a corporation of California
Filed July 30, 1968, Ser. No. 748,851
Int. Cl. B05b 17/08
U.S. Cl. 239—17                           5 Claims

ABSTRACT OF THE DISCLOSURE

The invention is productive of an aerated foam-like water fountain by a vertically positionable nozzle structure comprising an inner nozzle tube having in its wall circularly distributed air-passing openings, and an outer tube spaced about the nozzle tube to form a passage through which and said openings air is induced for turbulent admixture with water being projected in a convergent pattern into the nozzle tube opposite the openings.

SUMMARY OF THE INVENTION

The invention has for its general object to form an aerated water fountain having a foam-like state and consistency resulting from intimate aeration of the water, and which is productive of fountain effects such as light-appearing plumed patterns, aesthetically distinguishable from the conventional fountains in which the water is not preaerated.

Structurally the invention achieves the fountain effects by an efficient nozzle reducable to a three component assembly of a body having a pressurized water inlet, and a pair of concentrically spaced tubes carried by the body, the inner tube functioning as the fountain nozzle receiving water projected from the body in a convergent pattern followed by turbulent flow, and the outer tube serving as a duct through which air is induced by way of openings in the nozzle tube, into the convergently projected water pattern, thence to be thoroughly and intimately mixed with the water for its aeration.

In use, the nozzle assembly may be mounted within a body of water, the level of which is variable so as possibly to rise at times to the height of the air-passing nozzle openings. The presence of the outer tube assures freedom under all normal conditions of water interference of air passage to and through the openings.

The invention will be more fully understood from the following detailed description of an illustrative embodiment shown by the accompanying drawing, in which:

BRIEF DESCRIPTION OF THE DRAWINGS

FIG. 1 is illustrative of a fountain installation of the invention;

FIG. 2 is an enlarged cross section on line 2—2 of FIG. 1;

FIG. 3 is a cross section taken on line 3—3 of FIG. 2; and

FIG. 4 is a showing in perspective of the nozzle structure body.

DESCRIPTION OF THE PREFERRED EMBODIMENTS

Preliminarily it may be observed that the present nozzle structure is capable of various different mountings and modes of installation for projecting a fountain. Merely as illustrative, FIG. 1 shows the nozzle structure, generally indicated at 10, to be mounted within a basin 11 which the water may rise to a level 12 as high as or above the later described nozzle air inlet openings.

In reference to FIGS. 2 to 4, the structure 10 comprises a body 13 threaded at 14 for connection with pipe 15 conducting water under pressure appropriate for the fountain. The body contains concentric recesses or counter bores 16 and 17 press fitted to the lower ends of nozzle tube 18 and an outer tube 19. The nozzle tube contains in close relation to the body 13 circularly distributed openings 20 communicating with annular passage 21 between the tubes.

Body 13 contains a plurality of symmetrically spaced countersunk nozzle passages 22, typically four in number, leading from the bottom smoothly angular or tapered surface of the body, the axes of the passages converging toward coincidence with the tube 17 axes at a location generally opposite the openings 20. Thus the combined water streams converging from passages 22 create an induction venturi-like effect which draws air in through the openings 20. Beyond their convergence the combined water streams flow up through the nozzle tube in a state of turbulance which produces intimate admixture with the water of the air being induced with circular uniformity through openings 20.

Induced atmospheric air enters the open upper end of tube 19 at a location 23 sufficiently below the top of the nozzle tube 18 to avoid interference by the aerated fountain stream 24. Where the nozzle installation is such that the openings 20 are below the water level 12, the tube 19 serves as a closure against pool water access to the openings and interference with the induced air flow.

In a typical nozzle assembly productive of an effectively aerated fountain pattern, nozzle tube 18 may be formed of about 8¾ in. length, 1½ in. O.D. tubing; the outer tube of about 8⅜ in. length 2½ in. O.D. tubing; openings 20 as $^{11}/_{32}$ in. dia. bores axially converging at about 17° to the body-nozzle tube axis.

I claim:
1. A nozzle assembly vertically positionable to produce an aerated water fountain, comprising a body having a pressurized water inlet, a nozzle tube extending upwardly from a threaded connection with the body and having close thereto circularly distributed air-passing openings, said tube having an exposed top unrestricted cylindrical water outlet, means directing water from said inlet into the nozzle in plural streams and in a pattern converging axially thereof opposite said openings, and an open end outer tube having a threaded connecting with said body and spaced about the nozzle tube to form therewith an annular passage through which and said openings air is induced for turbulent admixture with said convergently patterned water flow opposite the openings.

2. A nozzle assembly according to claim 1, in which said body has concentric recesses receiving the lower ends of said tubes.

3. A nozzle assembly according to claim 1, in which said water directing means comprise four of said passages in the body directing separate water streams in said convergent pattern.

4. A nozzle assembly according to claim 1, in which said passages are circularly spaced about the projected nozzle tube axis and converge so that the projected passage axes are coincident with the nozzle axis at substantially the same location.

5. A nozzle assembly according to claim 4, in which the lower ends of said tubes are concentrically retained by the body and the nozzle tube projects above said outer tube.

References Cited

UNITED STATES PATENTS 3,292,861 12/1966 Kawamura et al. _____ 239—17

3,330,486 7/1967 Semple _____ 239—17 XR

M. HENSON WOOD, JR., Primary Examiner

G. A. CHURCH, Assistant Examiner

U.S. Cl. X.R.

239—22, 428.5

UNITED STATES PATENT OFFICE
CERTIFICATE OF CORRECTION

Patent No. 3,533,553              Dated   October 13, 1970

Inventor(s)  Gilbert J. Britzman

It is certified that error appears in the above-identified patent and that said Letters Patent are hereby corrected as shown below:

Column 2, line 44; delete "threaded" and insert therefor --press-fitted--

Column 2, line 50; delete "threaded" and insert therefor --press-fitted-- and "connecting" should read --connection--

Signed and sealed this 20th day of April 1971.

(SEAL)
Attest:

EDWARD M. FLETCHER, JR.            WILLIAM E. SCHUYLER, JR.
Attesting Officer                  Commissioner of Patents